United States Patent
Jitkoff et al.

(10) Patent No.: US 8,510,675 B1
(45) Date of Patent: Aug. 13, 2013

(54) HIDING WINDOW BORDERS

(75) Inventors: John Nicholas Jitkoff, Palo Alto, CA (US); Daniel T. Erat, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/495,871

(22) Filed: Jun. 13, 2012

(51) Int. Cl.
*G06F 3/048* (2006.01)

(52) U.S. Cl.
USPC .......................................... 715/788; 715/764

(58) Field of Classification Search
USPC ............................ 715/788, 798, 799, 800, 808
See application file for complete search history.

(56) References Cited

U.S. PATENT DOCUMENTS

| | | | | |
|---|---|---|---|---|
| 5,771,042 A | * | 6/1998 | Santos-Gomez | 715/800 |
| 6,819,345 B1 | * | 11/2004 | Jones et al. | 715/856 |
| 2012/0066641 A1 | * | 3/2012 | Doherty | 715/800 |
| 2012/0233570 A1 | * | 9/2012 | Li et al. | 715/825 |

OTHER PUBLICATIONS

"Control Your Windows Desktop With Mouse Gestures", Make Tech Easier—Uncomplicating the complicated, making life easier, May 1, 2009, retrieved from <http://maketecheasier.com/control-your-windows-desktop-with-mouse-gestures/2009/05/01>.

* cited by examiner

*Primary Examiner* — Haoshian Shih
(74) *Attorney, Agent, or Firm* — McDermott Will & Emery LLP (57) ABSTRACT

Systems and methods for interfacing with a window having a hidden border are provided. In some aspects, a method includes providing for presentation of a first window within a display, while providing for hiding a border of the first window. The method also includes receiving an indication of a first user input for interfacing with an edge of the first window. The method also includes providing for making visible the border of the first window in response to the indication of the first user input.

23 Claims, 9 Drawing Sheets

HIDING WINDOW BORDERS

FIELD

The subject technology generally relates to user interfaces in computer systems and, in particular, relates to hiding window borders.

BACKGROUND

Some operating systems allow users to manage one or more windows presented on a display. In order to allow the user to manage a window, the window may have a window border for moving or resizing the window. However, operating system developers may wish to modify the characteristics and operation of the window border, to give their operating systems a distinct look and feel. As the foregoing illustrates, a new approach to managing window borders may be desirable.

SUMMARY

The disclosed subject matter relates to a computer-implemented method for interfacing with a window having a hidden border. The method includes providing for presentation of a first window within a display, while providing for hiding a border of the first window. The method also includes receiving an indication of a first user input for interfacing with an edge of the first window. The method also includes providing for making visible the border of the first window in response to the indication of the first user input.

The disclosed subject matter further relates to a non-transitory computer-readable medium. The computer-readable medium includes instructions which, when executed by a computer, cause the computer to implement a method for interfacing with a window having a hidden border. The instructions include code for receiving an indication of a first user input for interfacing with an edge of a first window within a display. A border of the first window is hidden. The instructions also include code for providing for making visible the border of the first window in response to the indication of the first user input.

The disclosed subject matter further relates to a system. The system includes one or more processors. The system also includes a memory including instructions which, when executed by the one or more processors, cause the one or more processors to implement a method for interfacing with a window having a hidden border. The instructions include code for providing for presentation of a first window within a display, while providing for hiding a border of the first window. The instructions also include code for receiving an indication of a cursor being hovered over an edge of the first window. The instructions also include code for providing for making visible the border of the first window in response to the indication of the cursor being hovered over the edge of the first window.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As illustrated above, a new approach to managing window borders may be desirable. For example, an approach to hiding window borders while still allowing a user to intuitively move or resize windows may be desirable.

The subject technology is related to interacting with a window having a hidden border. In some implementations, a computer provides for presentation of a first window within a display (e.g., one or more screens), while providing for hiding a border of the first window. The first window may be associated with a software application, for example, a web browser or a word processor. The computer receives an indication of a first user input for interfacing with an edge of the first window. The first user input may correspond to hovering a cursor over the edge of the first window. The computer provides for making visible the border of the first window in response to the indication of the first user input. After the border is visible, the user may interact with the border, for example to move or resize the first window.

As used herein, the phrase "border of a window," encompasses its plain and ordinary meaning including, but not limited to a set of lines or rectangle along the edge of a window having a relatively low thickness (e.g., less than 20 pixels or 0.2 inches of thickness).

As used herein, the phrase "edge of a window," encompasses its plain and ordinary meaning including, but not limited to an intersection of the window and the edge of the display or the surrounding parts of the display and points within a certain distance, e.g., 10 pixels or 0.1 inches, from the intersection. An edge of a window may be covered by a border of the window, or the window may lack a border.

As used herein, the term "hidden," encompasses its plain and ordinary meaning including, but not limited to invisible to or difficult to detect via the naked eye of a typical user (e.g., a user having 20/20 vision) on a typical display (e.g., a screen of a laptop computer) who is positioned a typical distance (e.g., 0.7 meters) away from the display. An item, for example, a border, may be hidden it the item is invisible, transparent, or very thin (e.g., having a thickness of one pixel).

As used herein, the term "visible," encompasses its plain and ordinary meaning including, but not limited to easy to see for a typical user (e.g., a user having 20/20 vision) on a typical display (e.g., a screen of a laptop computer) who is positioned a typical distance (e.g., 0.7 meters) away from the display. An item, for example, a border, may be visible if it is opaque and thicker than a certain thickness (e.g., at least five pixels or 0.05 inches in thickness).

As used herein, the term "hover," encompasses its plain and ordinary meaning including, but not limited to, holding a cursor over a region (e.g., a point, a button, or a part of the display region) for at least a preset time (e.g., one tenth of a second, half of a second, one second, or two seconds).

Advantageously, in some implementations of the subject technology, the border may be hidden during a default operation of the computer. The border may become visible when the user indicates that he/she wishes to interact with the border, for example, to move or resize a window.

Figure 1:
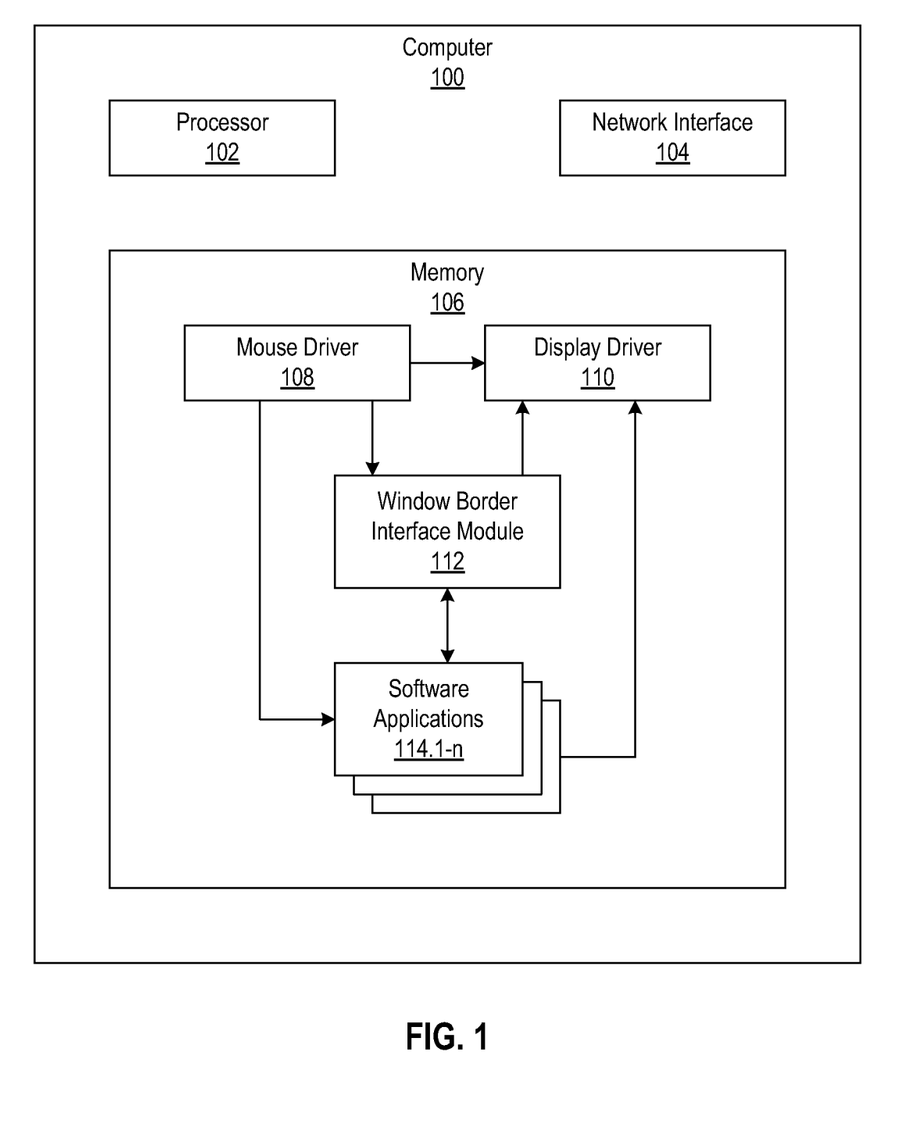
FIG. 1 illustrates an example computer configured to hide window borders.

FIG. 1 illustrates an example computer 100 configured to hide window borders. The computer 100 may be a laptop computer, a desktop computer, a netbook, a mobile phone, a tablet computer, a personal digital assistant (PDA), a digital music player, or a television with one or more processors embedded therein or coupled thereto.

As shown, the computer 100 includes a processor 102, a network interface 104, and a memory 106. The processor 102 is configured to execute computer instructions that are stored in a computer-readable medium, for example, the memory 106. The processor 102 may be a central processing unit (CPU). While only one processor 102 is illustrated, the computer 100 may include multiple processors. The network interface 104 is configured to allow the computer 100 to transmit and receive data in a network, e.g., the Internet, a WiFi network, an Ethernet network, or a cellular network. The network interface 104 may include one or more network interface cards (NICs). The memory 106 stores data or instructions. The memory 106 may be one or more of a cache unit, a storage unit, an internal memory unit, or an external memory unit, for example a universal serial bus (USB) memory drive, a compact disk (CD) memory drive, or a digital video disk (DVD) memory drive. As illustrated, the memory 106 includes a mouse driver 108, a display driver 110, a window border interface module 112, and one or more software applications 114.1-$n$.

The mouse driver 108 may be coupled with a internal mouse (e.g., on a laptop computer or netbook) or an external mouse (e.g., on a desktop computer). The mouse may be coupled with a cursor displayed on a display of the computer 100, for example, within the display region. The mouse driver 108 is configured to receive mouse movement information and to translate the mouse movement information to cursor movement information to be presented within a display region. The mouse movement information may be provided to the display driver 110, the window border interface module 112, or the software applications 114.1-$n$ to impact the operations of the display driver 110, the window border interface module 112, or the software applications 114.1-$n$. The mouse driver 108 is also configured to receive mouse click information (e.g., left click or right click) or mouse scroll wheel movement information. The mouse click information or mouse scroll wheel movement information may also be provided to the display driver 110, the window border interface module 112, or the software applications 114.1-$n$ to impact the operations of the display driver 110, the window border interface module 112, or the software applications 114.1-$n$. In some aspects, the mouse driver 108 may be replaced with another user input device driver, for example, a joystick driver, a touch screen driver, or a keyboard driver.

The display driver 110 may be coupled with a display (e.g., one or more screens or a projector). The display driver 110 receives information from the mouse driver 108, the window border interface module 112, or the software applications 114.1-$n$ and provides a display output to the display region based on the received information.

The window border interface module 112 is configured to provide for presentation (e.g., via operation of the display driver 110) of a first window (e.g., a window for one of the software applications 114) within a display, while providing for hiding a border of the first window. While hidden, the border of the first window may be transparent or may be thinner than or as thick as a first threshold thickness (e.g., one pixel). The window border interface module 112 is also configured to receive (e.g., via operation of the mouse driver 108) an indication of a first user input for interfacing with an edge of the first window. The first user input may correspond to, for example, the user hovering a cursor over the edge of the first window. The window border interface module is also configured to provide (e.g., via operation of the display driver) for making visible the border of the first window in response to the indication of the first user input. While visible, the border of the first window may be opaque and may be thicker than or as thick as a second threshold thickness (e.g., five pixels). The window border interface module is also configured to, upon receiving an indication of a termination of the first user input (e.g., the user stopping hovering the cursor over the edge of the first window), providing (e.g., via operation of the display driver) for hiding the border of the first window. While the border of the first window is still visible, the window border interface module 112 is configured to receive (e.g., via operation of the mouse driver 108) an indication of a second user input for requesting a window management action associated with the border of the first window (e.g., a click and drag of an edge of the first window for resizing the first window by moving the edge). The window border interface module 112 configured to provide (e.g., via operation of the display driver) for performing the window management action in response to the indication of the second user input.

The software applications 114.1-$n$ may include, for example, a web browser application, a word processor application, a video player application, or an audio file player application. The software applications 114.1-$n$ may receive input via the mouse driver 108, among other input sources (e.g., a camera driver or a keyboard driver) and provide output via the display driver 110 among other output sources (e.g., a speaker driver). When instantiated, a specific software application 114.$k$ may open one or more windows within the display region. The one or more windows may be managed via operation of the window border interface module 112.

While each of the drivers 108 and 110, the module 112, and each application 114.$k$ is illustrated as a single module, in some implementations, one or more modules may be combined to provide the functionality of the drivers 108 or 110, the module 112, or each application 114.$k$. For example, the module 112 may be divided into two or more sub-modules.

Figure 2:
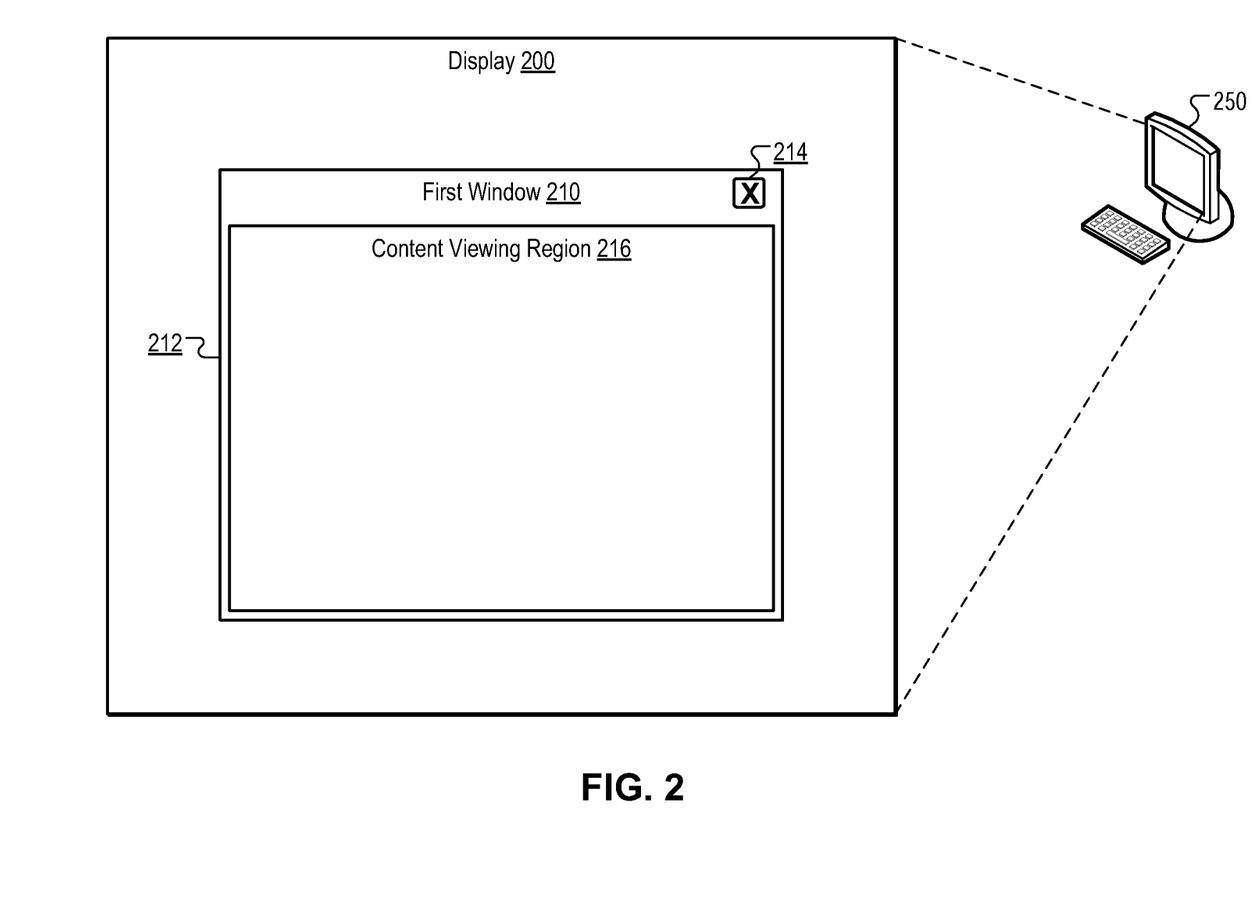
FIG. 2 illustrates an example of a display for a computer.

FIG. 2 illustrates an example of a display 200 for a computer (e.g., computer 100).

As shown, the display 200 corresponds to a computer screen 250. However, the display may correspond to one or more screens, to a projector output, or to any other visual output. The display 200 includes a first window 210.

As illustrated, the first window 210 includes an edge region 212 and a content viewing region 216.

As illustrated, the edge region 212 is be positioned immediately external the content viewing region 216. Alternatively, the edge region 212 may include an outer subregion of the content viewing region 216 of the first window 212. A border of the first window 210 may cover the edge region 212 of the first window 210. The border may include the edge region 212. In some examples, the edge region 212 includes one or more control buttons. For example, as shown, the edge region 212 includes a close button 214.

The content viewing region 216 may include content that is displayed within the first window 210. The content within the content viewing region 216 may correspond to a software application (e.g., one of the software applications 114.1-$n$) associated with the first window 210. For example, if the first window 210 corresponds to a web browser software application, the content viewing region 216 may include a webpage display. If the first window 210 corresponds to a word processing software application, the content viewing region 216 may include a document being viewed or edited.

FIGS. 3A-3I illustrate examples of displays 300A, 300B, 300C, 300D, 300E, 300F, 300G, 300H, and 300I of a computer (e.g., computer 100) configured to hide window borders.

Figure 3A:
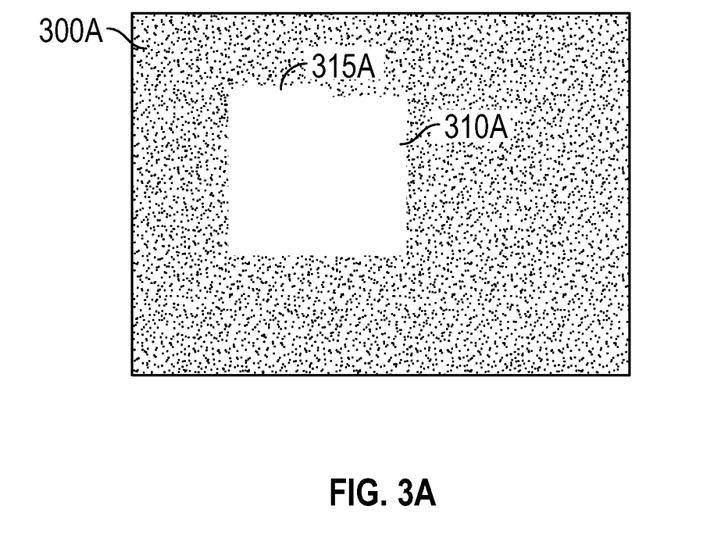
FIGS. 3A-3I illustrate examples of displays of a computer configured to hide window borders.

FIG. 3A illustrates a display 300A, in conjunction with which example aspects of the subject technology may be implemented. The display 300A includes a window 310A that includes a tab marker 315A. It should be noted that the border of the window 300A is hidden.

Figure 3B:
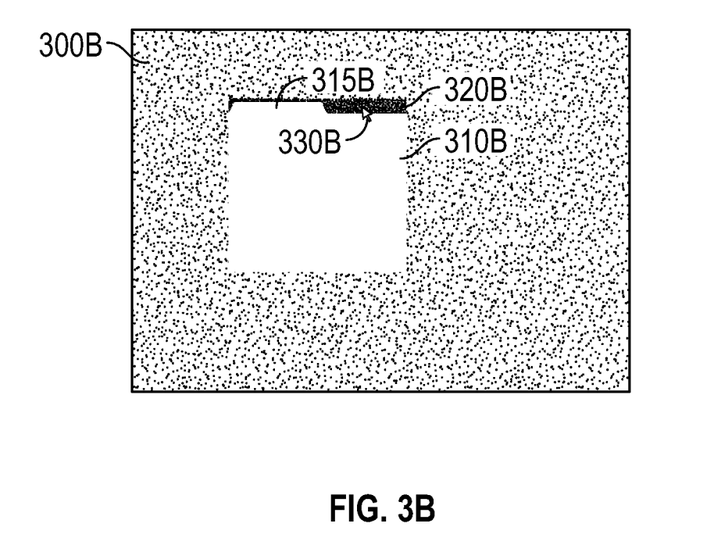

FIG. 3B illustrates a display 300B, in conjunction with which example aspects of the subject technology may be implemented. The display 300B is similar to the display 300A. The display 300B includes a window 310B that include a tab marker 315B. As shown, the user is hovering a cursor 330B over a top border 320B of the window 310B. As a result, the top border 320B becomes visible (opaque, rather than transparent).

Figure 3C:
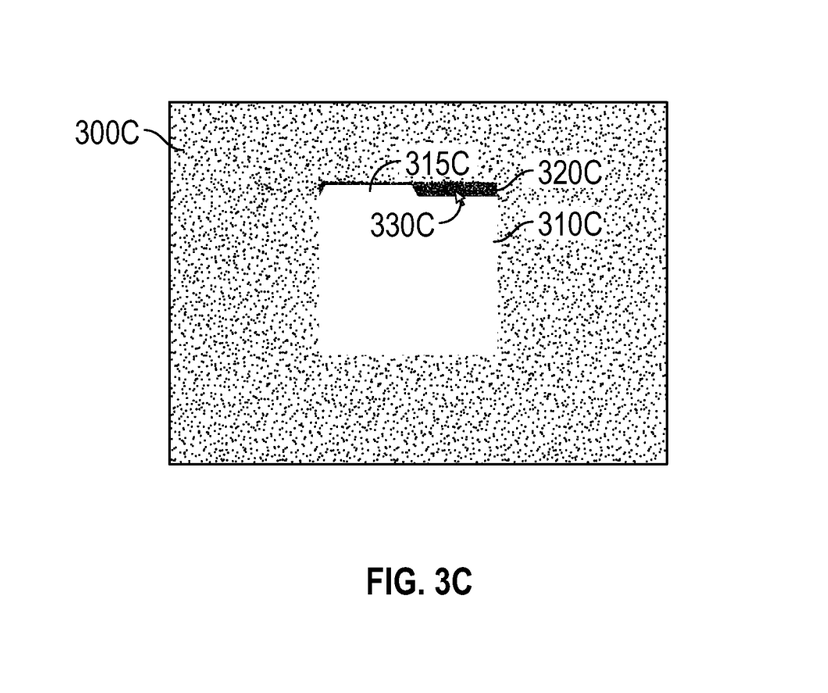

FIG. 3C illustrates a display 300C, in conjunction with which example aspects of the subject technology may be implemented. The display 300C similar to the display 300B. The display 300C includes a window 310C that includes a tab marker 315C. The user has clicked the cursor 330C over the top border 320B of the window 310C and may drag the window 310C using the click-and-drag technique.

Figure 3D:
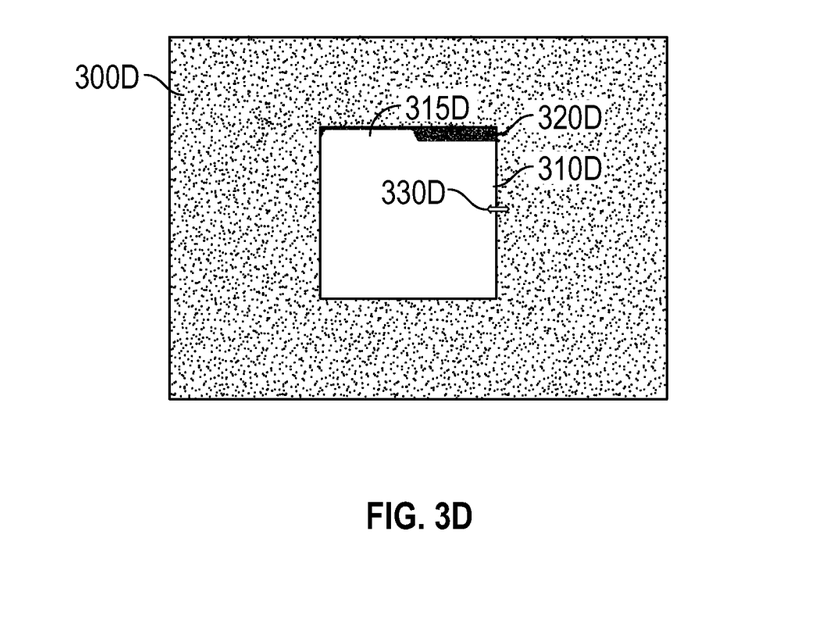

FIG. 3D illustrates a display 300D, in conjunction with which example aspects of the subject technology may be implemented. The display 300D includes a window 310D that includes a tab marker 315D. The user is hovering the cursor 330D over the right border 320D. As a result of the hovering, the cursor 330D turns into a bidirectional arrow and the border 320D appears over the right edge, so that the user can move the border 320D, via operation of the cursor 330D, to resize the window 310D.

Figure 3E:
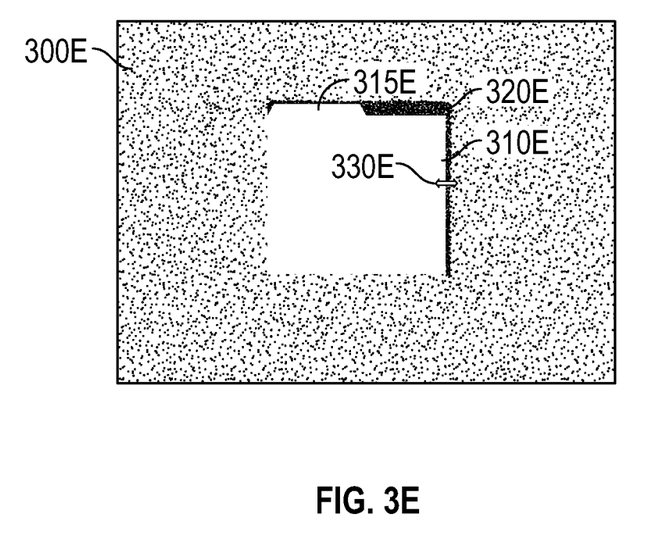

FIG. 3E illustrates a display 300E, in conjunction with which example aspects of the subject technology may be implemented. The display 300E includes a window 310E that includes a tab marker 315E. The user is hovering a cursor 330E over the border 320E of the window 310E. As a result of the hovering, the right border 320E appears expanded (relative to the right border 320D of FIG. 3D) to indicate that the right edge is activated. The bottom and left edges of the window 310E may not have a border, as those edges are not activated. The cursor 330E turns into a bidirectional arrow.

The user can move the right border 320E using the cursor 330E to resize the window 310E.

Figure 3F:
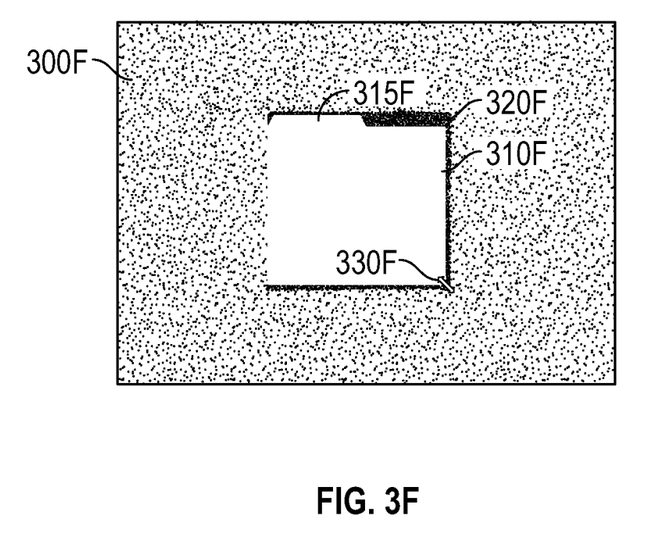

FIG. 3F illustrates a display 300F, in conjunction with which example aspects of the subject technology may be implemented. The display 300F includes a window 310F that includes a tab marker 315F. The user is hovering a cursor 330F at a bottom right corner of the window 310F causing a border 320F to appear. The bottom and right border 320F is expanded (relative to the border 320D of FIG. 3D) to indicate that the bottom and edges are activated. The left edge of the window 310F may not have a border, as that edge is not activated. The cursor 330F turns into a slanted bidirectional arrow. The user can move the bottom and right border 320F using the cursor 330F to resize the window 310F.

Figure 3G:
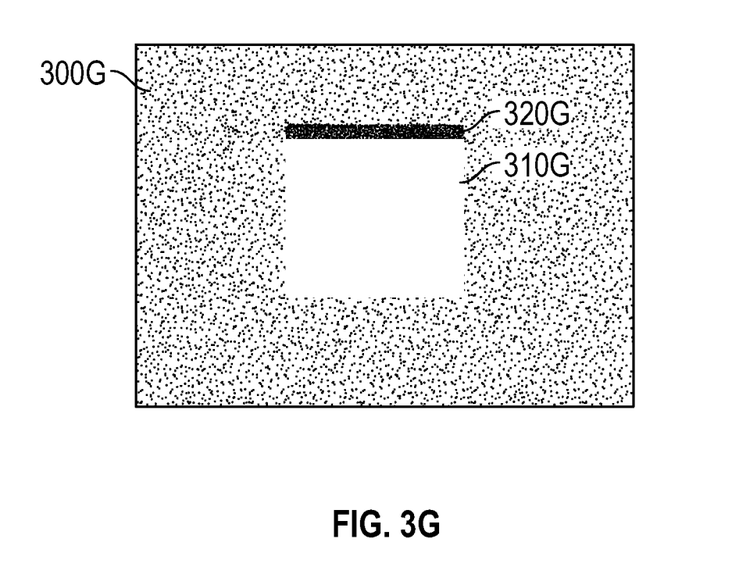

FIG. 3G illustrates a display 300G, in conjunction with which example aspects of the subject technology may be implemented. The display 300G includes a window 310G. The window 310G has a top border 320G, but no side borders. The side borders may be activated by operation of a cursor, as illustrated in FIGS. 3D-3F.

Figure 3H:
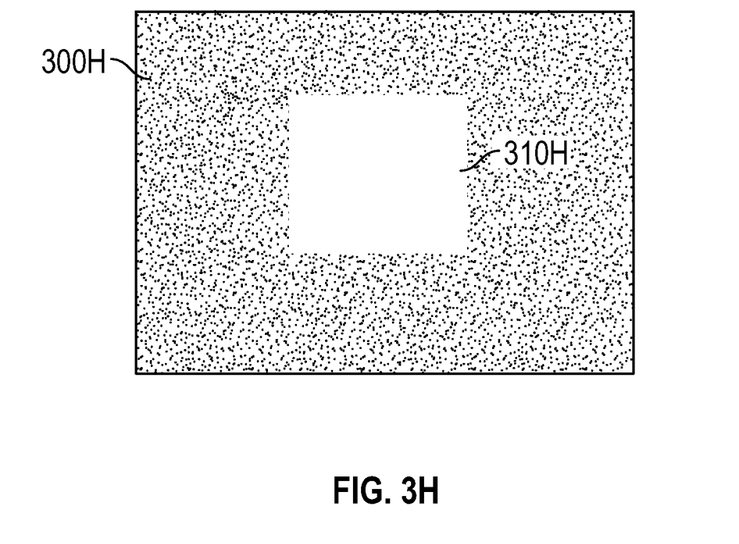

FIG. 3H illustrates a display 300H, in conjunction with which example aspects of the subject technology may be implemented. The display 300H includes a window 310H. As illustrated, the window 310H includes no borders. However, one or more of the side borders of the window 310H may be activated by operation of a cursor, as illustrated in FIGS. 3B-3F.

Figure 3I:
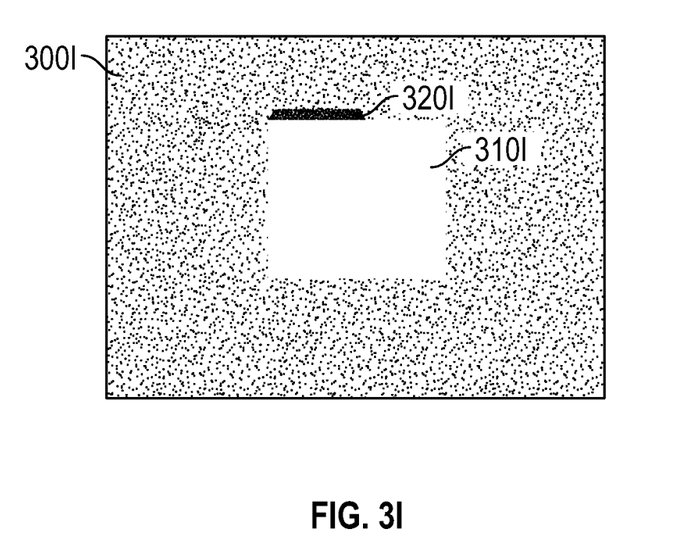

FIG. 3I illustrates a display 300I, in conjunction with which example aspects of the subject technology may be implemented. The display 300I includes a window 310I. The window 310I includes an opaque tab 320I. However, the window 310I includes no side borders, aside from a partial side border along the tab 320I. One or more of the side borders of the window 310I may be activated by operation of a cursor, as illustrated in FIGS. 3B-3F.

Figure 4:
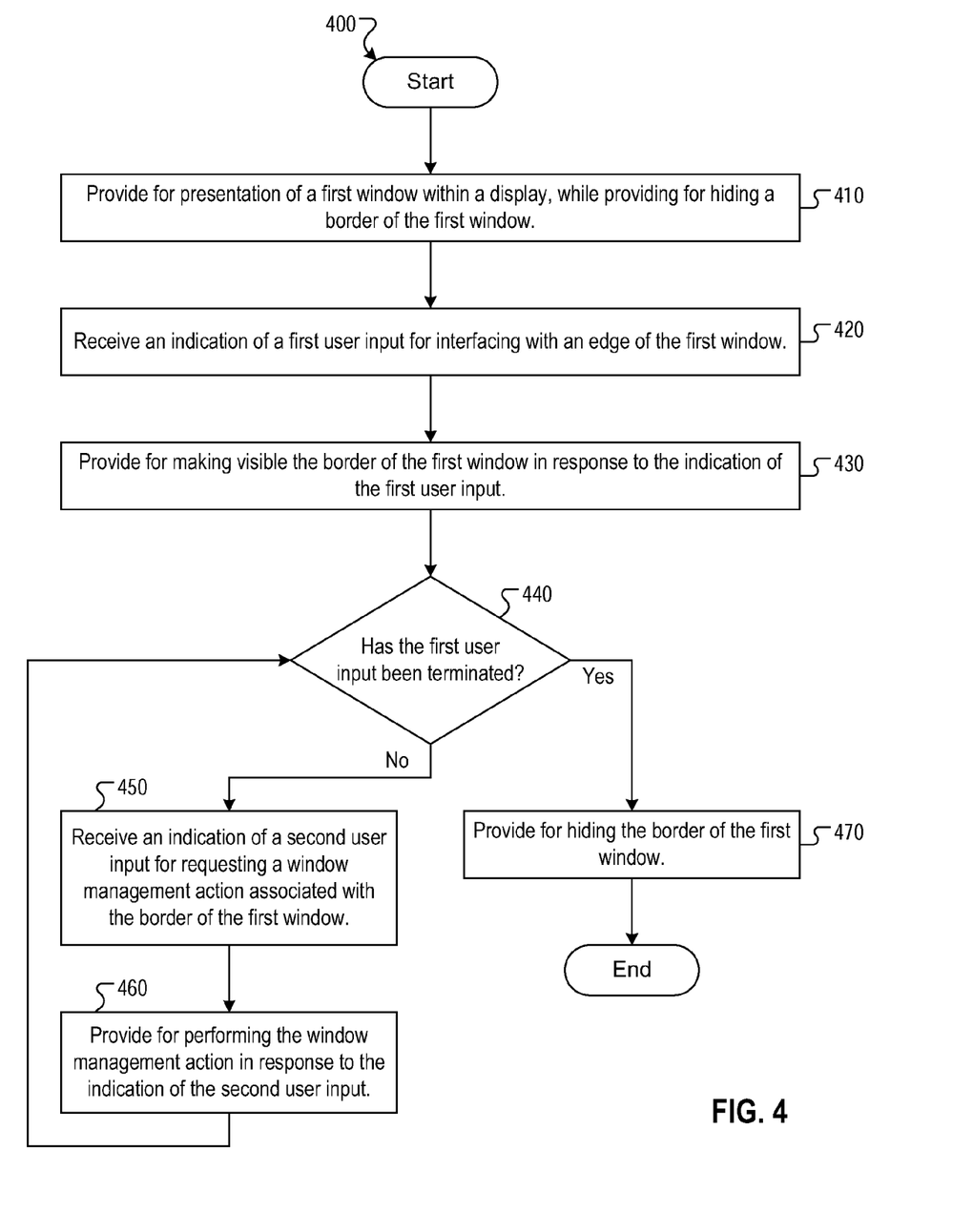
FIG. 4 illustrates an example process by which a window having a hidden border may be managed.

FIG. 4 illustrates an example process 400 by which a window having a hidden border may be managed.

The process 400 begins at step 410, where a computer (e.g., computer 100, via operation of the window border interface module 112) provides for presentation of a first window within a display, while providing for hiding a border of the first window. (See, for example, window 310A of FIG. 3A.)

In step 420, the computer receives an indication of a first user input for interfacing with an edge of the first window. The border of the first window may include the edge of the first window. The first user input may include hovering a cursor over the edge of the first window. In one example, a mouse driver (e.g., mouse driver 108) transmits to one or more modules responsible for implementing the process 400 (e.g., the window border interface module 112) an indication of a cursor being hovered over a position corresponding to the edge of the first window.

In step 430, the computer provides for making visible the border of the first window in response to the indication of the user input.

Hiding the border of the first window may include making transparent the border of the first window. Making visible the border of the first window may include making opaque the border of the first window.

Alternatively, hiding the border of the first window may include setting the border of the first window to a first thickness. The first thickness is at most a first threshold thickness (e.g., one pixel). Making visible the border of the first window may include setting the border of the first window to a second thickness. The second thickness is at least a second threshold thickness (e.g., five pixels).

In some aspects, the first user input for interfacing with the edge of the first window is associated with a portion of the edge (e.g., the right side of the edge, as illustrated in FIG. 3E). Making visible the border of the first window may include assigning an expanded thickness (e.g., 0.1 inches or 10 pixels) to a first portion of the border corresponding to the portion of the edge and assigning an unexpanded thickness (e.g., 0.05 inches or 5 pixels) to a second portion of the border not corresponding to the portion of the edge. The expanded thickness may exceed the unexpanded thickness. In some examples (e.g., as illustrated in FIG. 3E), the unexpanded thickness may be zero (i.e., no border is displayed in the portions of the border to which the unexpanded thickness is assigned).

In step 440, the computer determines whether the first user input has been terminated. The computer may receive an indication (e.g., via operation of the mouse driver 108) when the first user input is terminated. If the first user input has not been terminated, the process 400 continues to step 450. If the first user input has been terminated, the process 400 continues to step 470.

In step 450, if the first user input has not been terminated, the computer receives an indication of a second user input for requesting a window management action associated with the border of the first window.

The second user input may include clicking and dragging the border of the first window for resizing the first window. The second user input may include clicking and dragging the border of the first window (e.g., at the top of the border of the first window) for moving the first window within the display. The second user input may include selecting a control button (e.g., close button 214 of FIG. 2) within the border. A control button may be selected, for example, by clicking the control button.

In one example, the edge of the first window may be shared by the first window and a second window. (E.g., A display may include a window of a document management program on a left half of the display and a window of web browser on a right half of the display. The right edge of the document management program window may be shared with the left edge of the web browser window.) The second user input may include dragging the border of the first window for resizing both the first window and the second window simultaneously. (E.g., The user may move the right edge of the document management program window to the right, making the document management program window larger and the web browser window smaller simultaneously.)

In step 460, the computer provides for performing the window management action in response to the indication of the second input. After step 460, the process 400 returns to step 440.

In step 470, if the first user input has been terminated, the computer provides for hiding the border of the first window. In one example, the computer may receive an indication (e.g., via operation of the mouse driver 108) that the first user input has been terminated and provide for hiding the border of the first window in response to the indication that the first user input has been terminated. After step 470, the process 400 ends.

In some implementations, instructions for implementing the steps 410-450 in the process 400 may be stored in a memory of a computer (e.g., in the window border interface module 112) and may be implemented by the computer. The steps 410-470 in the process 400 may be carried out in series. Alternatively, two or more of the steps 410-470 in the process 400 may be carried out in parallel.

Figure 5:
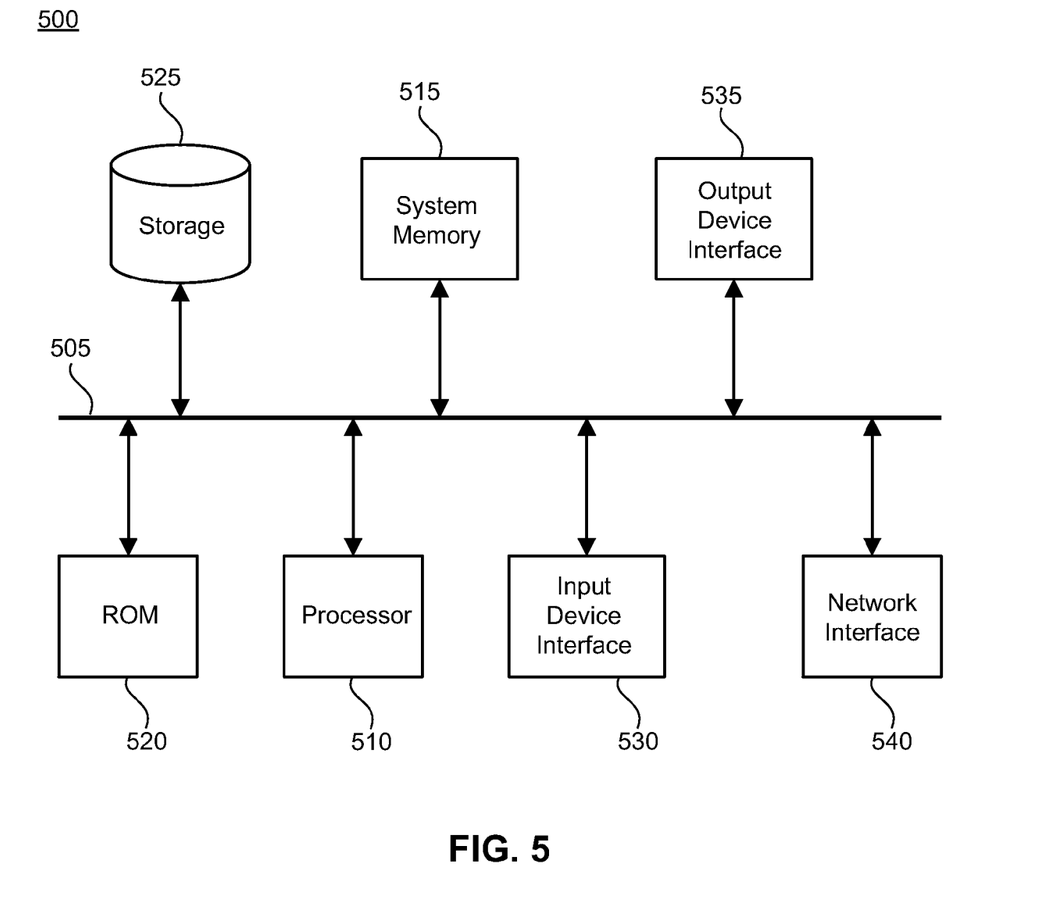
FIG. 5 conceptually illustrates an example electronic system with which some implementations of the subject technology are implemented.

FIG. 5 conceptually illustrates an electronic system 500 with which some implementations of the subject technology are implemented. For example, the computer 100 may be implemented using the arrangement of the electronic system 500. The electronic system 500 can be a computer (e.g., a mobile phone, PDA), or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the subject technology use a mass-storage device (for example a magnetic or optical disk and its corresponding disk drive) as the permanent storage device 525.

Other implementations use a removable storage device (for example a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, or the read-only memory 520. For example, the various memory units include instructions for hiding window borders in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, for example cathode ray tubes (CRT) or liquid crystal displays (LCD). Some implementations include devices for example a touchscreen that functions as both input and output devices.

Finally, as shown in FIG. 5, bus 505 also couples electronic system 500 to a network (not shown) through a network interface 540. In this manner, the electronic system 500 can be a part of a network of computers (for example a local area network ("LAN"), a wide area network ("WAN"), or an Intranet, or a network of networks, for example the Internet. Any or all components of electronic system 500 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for interfacing with a window having a hidden border, the method comprising:
   providing for presentation of a first window within a display, while providing for hiding a border of the first window along a first side, a second side, and a third side of the first window;
   receiving an indication of a first user input for interfacing with the first side of the first window;
   providing for making visible the border of the first window along the first side of the first window in response to the indication of the first user input, while continuing to provide for hiding the border of the first window along the second side and the third side of the first window, wherein the visible border of the first window along the first side is for moving the first side to resize the first window;
   receiving an indication of an additional user input for interfacing with both the first side and the second side of the first window; and
   providing for making visible the border of the first window along the first side and the second side in response to the indication of the additional user input, while continuing to provide for hiding the border of the first window along the third side of the first window, wherein the visible border of the first window along the first side and the second side is for moving the first side and the second side to resize the first window.

2. The method of claim 1, wherein the first user input comprises hovering a cursor over the first side of the first window.

3. The method of claim 1, further comprising:
   receiving an indication of a termination of the first user input; and
   providing for hiding the border of the first window along the first side in response to the indication of the termination of the first user input.

4. The method of claim 1, further comprising:
   receiving an indication of a second user input for requesting a window management action associated with the border of the first window; and
   providing for performing the window management action in response to the indication of the second user input.

5. The method of claim 4, wherein the second user input comprises dragging the border of the first window for resizing the first window.

6. The method of claim 4, wherein the second user input comprises dragging the border of the first window for moving the first window within the display.

7. The method of claim 4, wherein the second user input comprises selecting a control button within the border.

8. The method of claim 4, wherein the first side of the first window is shared by the first window and a second window, and wherein the second user input comprises dragging the border of the first window for resizing the first window and the second window.

9. The method of claim 1, wherein hiding the border of the first window comprises making transparent the border of the first window, and wherein making visible the border of the first window comprises making opaque the border of the first window.

10. The method of claim 1, wherein hiding the border of the first window comprises setting the border of the first window to a first thickness, wherein the first thickness is at most a first threshold thickness, and wherein making visible the border of the first window comprises setting the border of the first window to a second thickness, wherein the second thickness is at least a second threshold thickness.

11. The method of claim 10, wherein the first threshold thickness is one pixel.

12. The method of claim 10, wherein the second threshold thickness is five pixels.

13. The method of claim 1, wherein the first side and the second side of the first window are immediately external to a content viewing region of the first window.

14. The method of claim 1, wherein the first side and the second side of the first window are a part of an outer subregion of a content viewing region of the first window.

15. The method of claim 1, wherein the border of the first window comprises the first side of the first window.

16. A computer-readable medium for interfacing with a window having a hidden border, the computer-readable medium comprising instructions which, when executed by a computer, cause the computer to:

receive an indication of a first user input for interfacing with a first side of a first window within a display, wherein a border of the first window is hidden along the first side, a second side, and a third side of the first window;

provide for making visible the border of the first window along the first side of the first window in response to the indication of the first user input, while continuing to provide for hiding the border of the first window along the second side and the third side of the first window, wherein the visible border of the first window along the first side is for moving the first side to resize the first window;

receive an indication of an additional user input for interfacing with both the first side and the second side of the first window; and provide for making visible the border of the first window along the first side and the second side in response to the indication of the additional user input, while continuing to provide for hiding the border of the first window along the third side of the first window, wherein the visible border of the first window along the first side and the second side is for moving the first side and the second side to resize the first window.

17. The computer-readable method of claim 16, wherein the first user input comprises a cursor being hovered over the first side of the first window.

18. The computer-readable medium of claim 16, further comprising instructions which, when executed by the computer, cause the computer to:

receive an indication of a termination of the first user input; and provide for hiding the border of the first window along the first side in response to the indication of the termination of the first user input.

19. The computer-readable medium of claim 16, further comprising instructions which, when executed by the computer, cause the computer to:

receive an indication of a second user input for requesting a window management action associated with the border of the first window; and provide for performing the window management action in response to the indication of the second user input.

20. The computer-readable medium of claim 16, wherein the border of the first window being hidden comprises the border of the first window being transparent, and wherein making visible the border of the first window comprises making opaque the border of the first window.

21. The computer-readable medium of claim 16, wherein the border of the first window comprises the first side of the first window.

22. The computer-readable medium of claim 16, wherein the instructions to provide for making visible the border of the first window along the first side of the first window comprise instructions which, when executed by the computer, cause the computer to:

assign an expanded thickness to a first portion of the border corresponding to the first side; and assign an unexpanded thickness to a second portion of the border not corresponding to the first side, wherein the expanded thickness exceeds the unexpanded thickness.

23. A system for interfacing with a window having a hidden border, the system comprising:

one or more processors; and a memory comprising instructions which, when executed by the one or more processors, cause the one or more processors to:

provide for presentation of a first window within a display, while providing for hiding a border of the first window along a first side, a second side, and a third side of the first window;

receive an indication of a cursor being hovered over the first side of the first window; and provide for making visible the border of the first window along the first side of the first window in response to the indication of the cursor being hovered over the first side of the first window, while continuing to provide for hiding the border of the first window along the second side and the third side of the first window, wherein the visible border of the first window along the first side is for moving the first side to resize the first window;

receive an indication of an additional user input for interfacing with both the first side and the second side of the first window; and provide for making visible the border of the first window along the first side and the second side in response to the indication of the additional user input, while continuing to provide for hiding the border of the first window along the third side of the first window, wherein the visible border of the first window along the first side and the second side is for moving the first side and the second side to resize the first window.

* * * * *